UNITED STATES PATENT OFFICE.

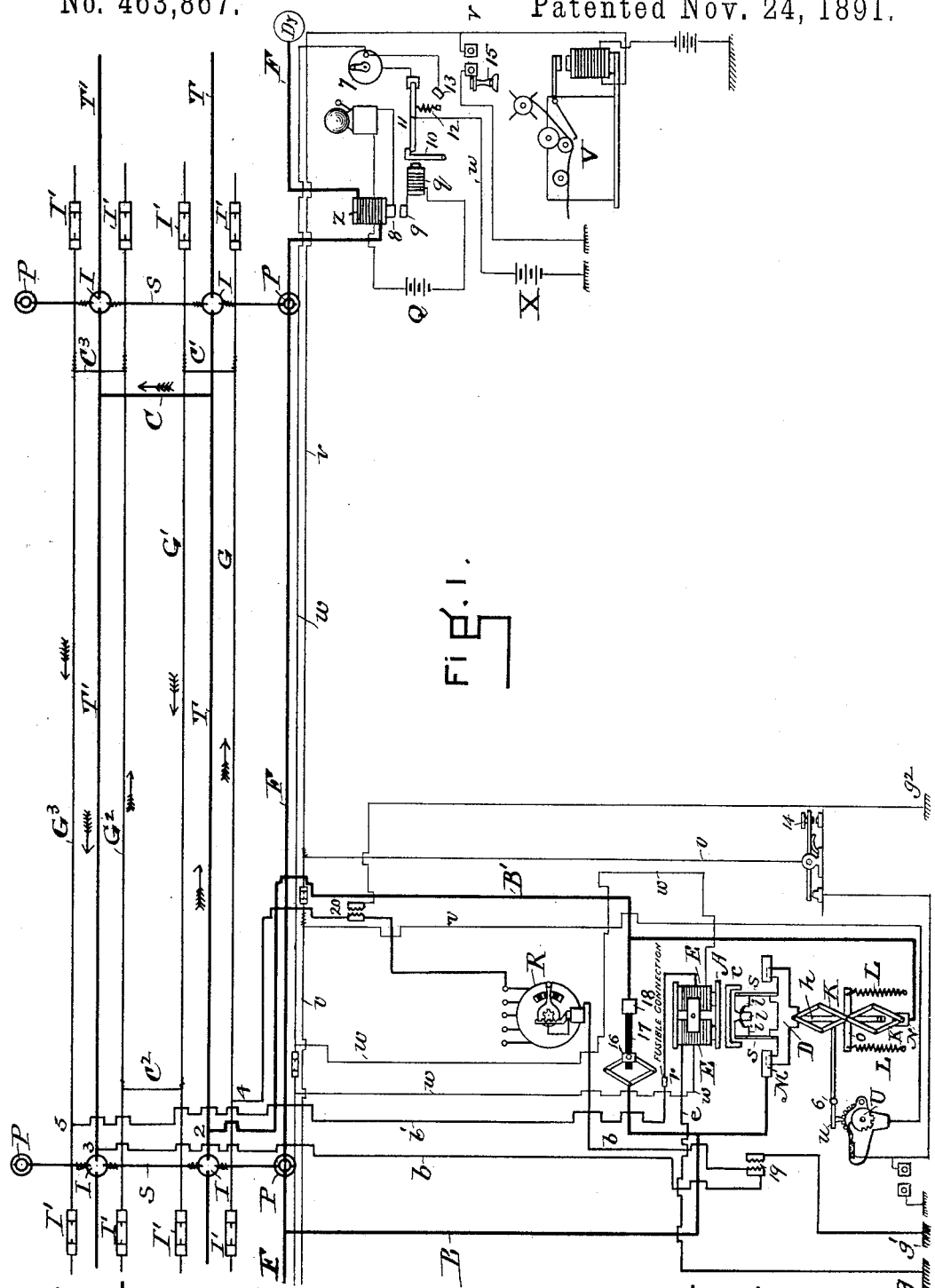

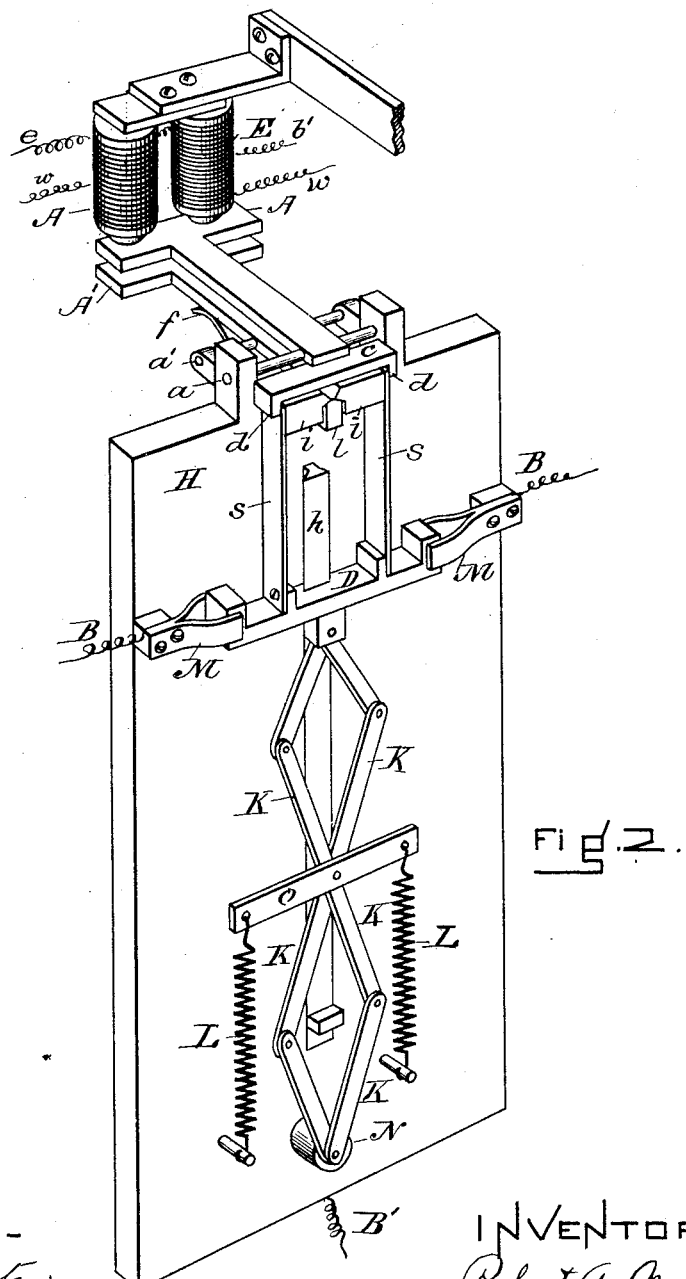

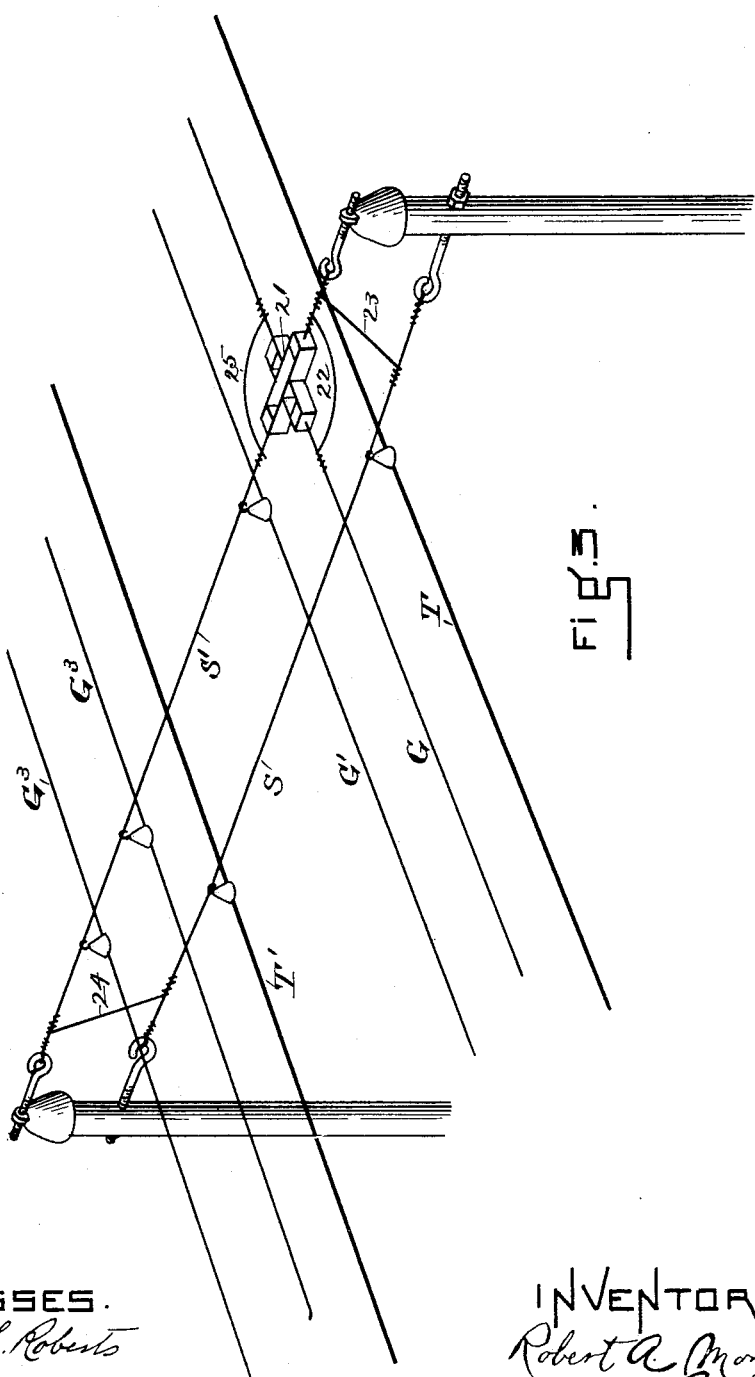

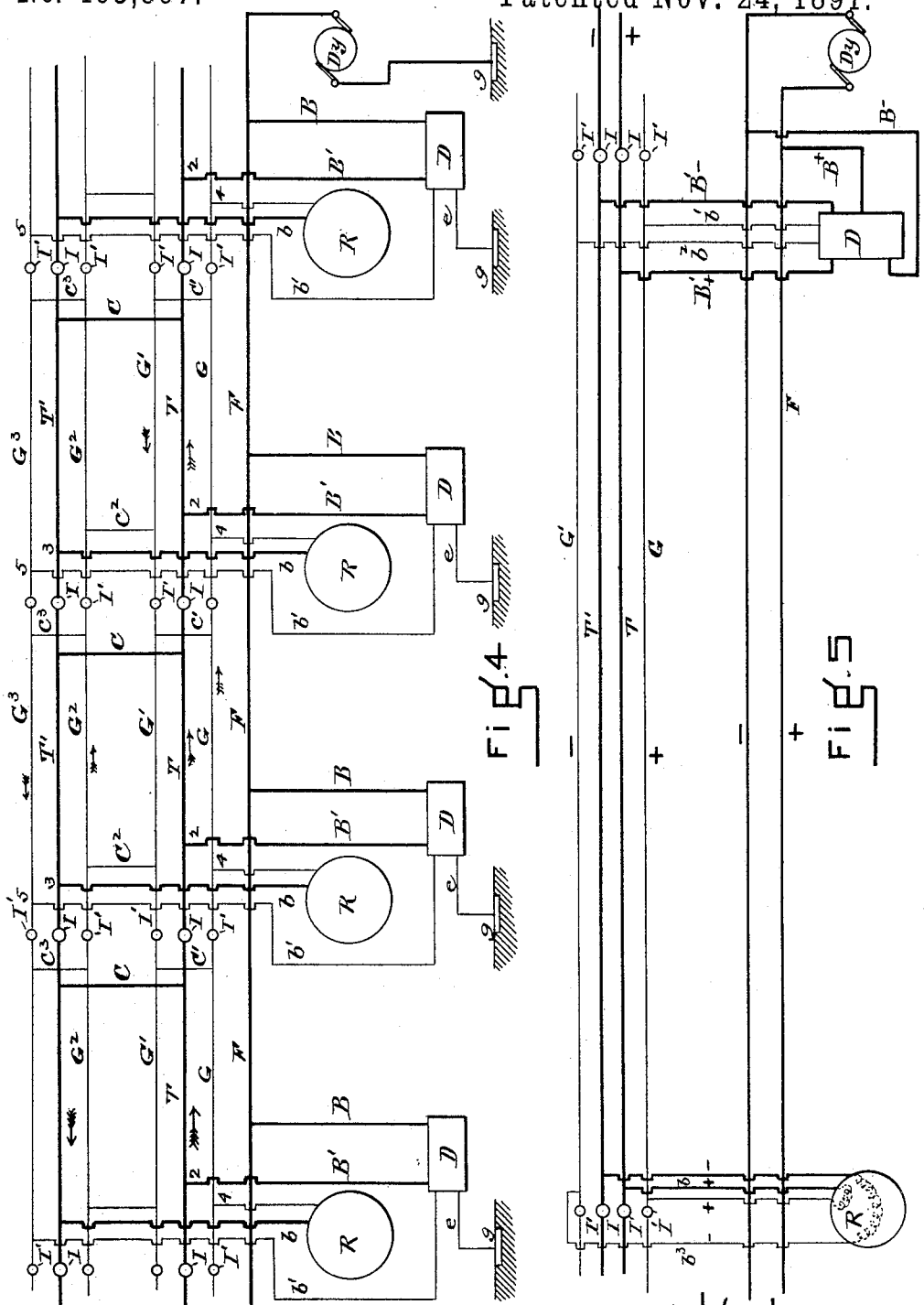

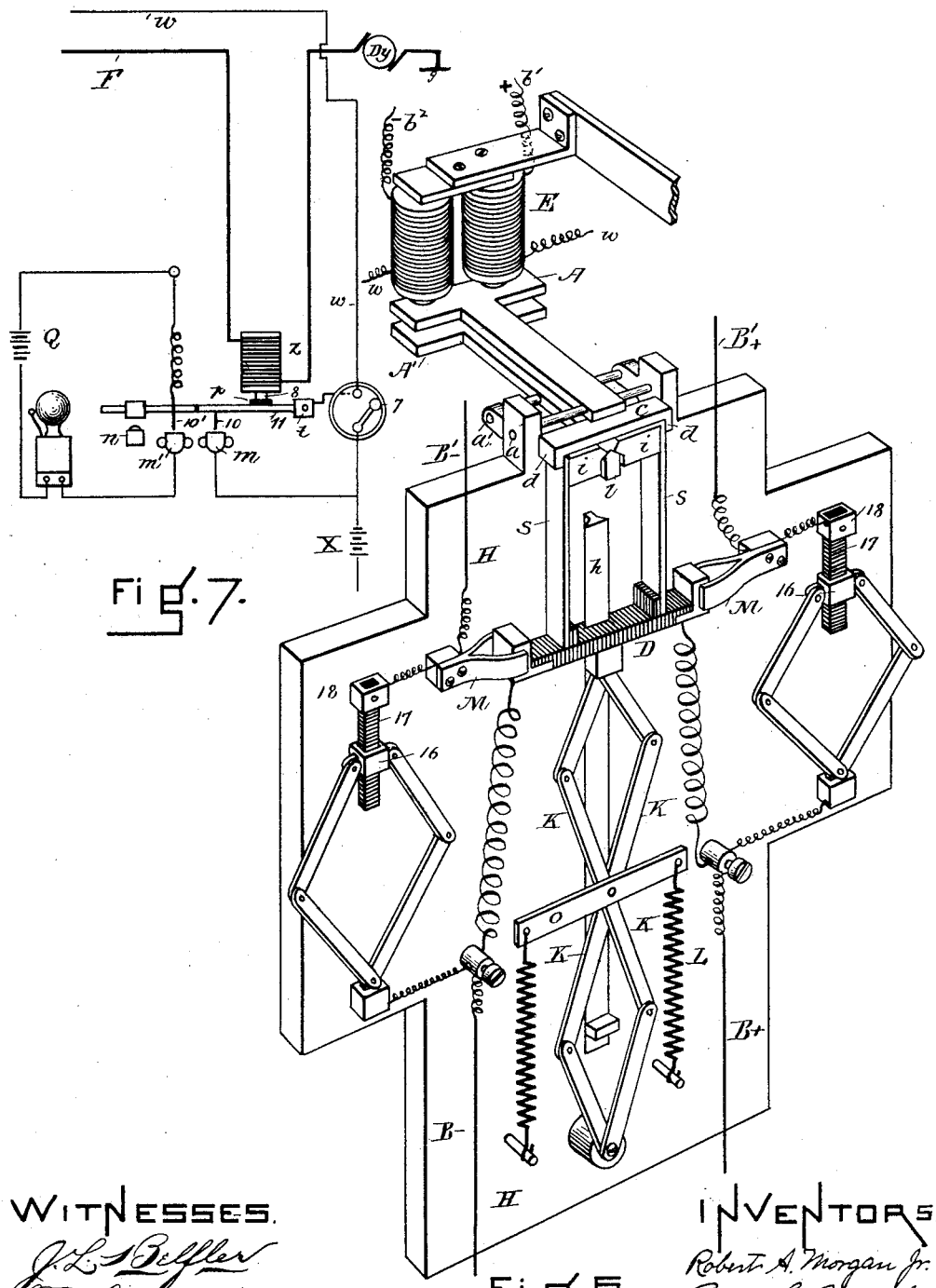

ROBERT A. MORGAN, JR., OF BOSTON, AND GEORGE C. BOSSON, JR., OF LAWRENCE, MASSACHUSETTS.

AUTOMATIC SAFETY CUT-OUT FOR ELECTRICAL CONDUCTORS.

SPECIFICATION forming part of Letters Patent No. 463,867, dated November 24, 1891.

Application filed November 28, 1890. Serial No. 372,964. (No model.)

*To all whom it may concern:*

Be it known that we, ROBERT A. MORGAN, Jr., of Boston, in the county of Suffolk, and GEORGE C. BOSSON, Jr., of Lawrence, in the county of Essex, both in the State of Massachusetts, have invented an Improved System and Combination of Devices for Operating an Automatic Safety Cut-Out for Electrical Conductors, of which the following description, with the drawings accompanying the same, is a specification.

This invention relates to a system of electrical circuits in which currents of high potential or great volume are carried by overhead conductors, which may be operated either as ground-circuits or metallic circuits, and are provided with automatic cut-out devices which are controlled by a current carried upon supplemental wires or conductors, which are preferably supported above the said overhead conductors.

The invention is especially intended to prevent fires and obviate the fatal accidents to living creatures so often caused by contact either with a broken conductor carrying a voluminous current or one of high potential, or with an overhanging wire which may have fallen upon such conductor. It is particularly applicable to the overhead system of conductors at present largely employed in electric railways, and it may also be used to advantage in connection with electric-light circuits.

Heretofore the guard-wires used to protect the trolley-wires of an electric railway and the span-wires which sustain the trolley-wires and the said guard-wires have been insulated as far as possible from the trolley-wires and practically may be said to be "dead" wires, and if any of these dead wires accidentally broken should rest upon the trolley-wire and extend downward sufficiently far to be touched by a passing living being contact with said broken wire will endanger the life of said being, as has been frequently demonstrated; also, fire is liable to ensue from the heat engendered by the passage of such dangerous currents through the apparatus connected with the wires of some other system—such as the telegraph, telephone, or electric clock, &c.—whenever the wires thereof are brought into contact with the conductors carrying such dangerous currents.

This invention is intended effectually to obviate these dangers; and it consists in electrically connecting together the guard-wires in each section of the electric circuit—for instance, of a railway—or the guard and span wires thereof, placing a mechanical circuit-breaker (hereinafter described) in such railway-circuit, and passing a reduced current through said guard and span wires and through the coils of an electro-magnet, the armature of which is arranged to operate the said circuit-breaker, and thus open the main or railway circuit whenever the current through the guard and span wires becomes too weak to hold up the armature by reason of a break in any of such wires or by contact with an overhanging wire which makes a short circuit to ground.

In the drawings forming a part of this specification is illustrated my improved system as applied to an electric railway provided with overhead conductors.

Similar letters and numerals indicate the same portion of the system or part of the devices in the several figures.

Figure 1 illustrates a plan view of the railway electrical conductors, guard, and span-wires of a single-trolley system and an elevation of the mechanical cut-out devices and other apparatus connected therewith; Fig. 2, a perspective view of the safety cut-out or circuit-breaker and its connected parts, which we have found effective for the purpose. Fig. 3 illustrates the manner of connecting the span-wires with the guard-wires in our improved system. Fig. 4 is a conventional diagram showing several sections of a single-trolley road with our improvements combined therewith. Fig. 5 in the same manner illustrates their application to a double-trolley or metallic system with the requisite modifications in the connecting-wires. Fig. 6 is our cut-out, showing the connections for a metallic circuit, with a switch upon either side by which the current may be carried around the cut-out. Fig. 7 is a modification of the devices by which a battery-current is automatically switched upon the independent line to control the armatures, which would otherwise operate the cut-out when the main current is turned off.

Referring to the drawings, especially to Fig. 1, F is a continuous feed-wire upon which the current is carried from the dynamo D y at the electric-power station along the entire line. The several sections of electrical conductors into which the railway system is divided, as illustrated in Fig. 4, are loops or shunt-circuits of the whole multiple system supplied by branch wires leading from the feed-wire F.

T T' are the trolley-wires, G G' G² G³ the guard-wires, and S S' the span-wires, which extend between posts P and sustain the trolley and guard wires. In the system illustrated the trolley and guard wires in each section or loop are all connected in one circuit, C being the connection between the trolley-wires and C' C² C³ the connections between the guard-wires.

B is a branch leading from the feed-wire F down to the spring-metal contact M, thence through the bar D and the circuit-breaker and back through the conductor B', and connects with the trolley-wire T at 2. By reason of the resistance between the main or trolley line and the supplemental or guard wire line when there is no car in any section a very small current passes from the feed-wire F, over the shunt-wire B, through the cut-out over the wire B, and thence along the trolley-wire T in the direction of the arrow, thence across the connecting-wire C and back along the other trolley-wire T' in the direction of the arrow, thence at 3 along the branch b, leading to the supplemental or guard wire system, through the resistance-box R, and thence back, where it connects at 4 with the guard-wire G. This reduced current then passes from the wire G in the direction of the arrow, through the connecting-wire C', back along the guard-wire G', crossing the connecting-wire C², along the guard-wire G², crossing the connecting-wire C³, back along the guard-wire G³, where at 5 it passes over a branch b', through the coils of an electro-magnet E, thence outward along the conductor e to ground at g. This completes an entire circuit of our improved system of an automatic safety circuit-breaker as applied (in Fig. 1) to one section of a single-trolley electric railway.

The current which passes over the supplemental or guard wire system becomes a harmless or low-potential current after passing the resistance-box R, which, as is well understood, may be of the construction known as an "automatically-adjustable resistance" or any other form which may be found advantageous for use for the purpose. In the illustrations, Figs. 1 and 5, the section of the electric circuit comprised in this system is contained between two sets of supporting-posts or the span-wires extended between them, the trolley-wires being broken or insulated at I and the guard-wires at I'. The length of conductors included in each section of the system may be varied as desired. Conveniently a distance of five hundred feet may be controlled by one circuit-breaker, and the circuit for each section is the same as that above described. The armature A of the electro-magnet E, Figs. 1 and 2, is pivoted at a to a frame or board H. Beneath it is a lever A', pivoted at a', with a spring f to sustain the outer end of that lever. At the opposite end of the lever A' a bar c is attached, having downwardly-projecting portions d. This lever A' constitutes a part of the mechanical circuit-breaker, which we have found well adapted for use in this system, and it further consists of a cross-bar D, having attached to it and extending upward springs s, upon the inside of each of which at their upper ends is a projecting hook or finger i, which extends over and holds upon a lug l, fastened to the frame H, when the bar D is in a position to make contact between the spring-jaws M, which are in circuit with the main or trolley line. After the hooks i have been pressed inward over the lug l the projecting portions d of the bar c will drop down and overlap the upper ends of the springs s and hold them in that position until the opposite end of the lever A' is forced downward, and thus raise the bar c from the position shown in Fig. 2. The bar D has a dovetailed groove in one side of it, which slides upon a guide h, attached to the frame H, and is thus controlled in its perpendicular movement up and down.

In order that the contact-bar D of the circuit-breaker may have a wide range of movement, so as to prevent the formation and continuance of an electric arc between the spring-jaws M and the ends of the bar D when contact between them is broken, a set of toggle-arms K is employed to make the connection between the bar D and the metal standard N, through which the circuit is continued to the trolley-wire.

To accelerate the movement of the circuit-breaker bar D when the hooks i are released from the lug l, one or more springs L are attached at one end to the toggle-arms K—for instance, by means of a bar O—and at their other ends are made fast to the frame H.

As heretofore stated, a small or reduced current from the feed-wire is continually passing over the branch B through the circuit-breaker and branch B' out along the trolley-wire; but as soon as a car moves into the section the current over the branch increases and a sufficient quantity passes from the trolley-wire down through the trolley and motor to propel the car, and thence to ground through the rails, or to a return-wire in the ground with which the rails may be connected. The movement of the cars along any section will not, however, affect the cut-out, for, as is well known in electric-railway as well as in electric-light systems, a substantially constant current is maintained by the automatic regulator connected with the electric generator. As long as the bar D remains in contact with the spring-jaws M the current will continue unobstructed; also, while the current of electricity passes through the electro-magnet E the armature A will be held up thereby in the position shown in the drawings. As soon, however, as the current through the said magnet ceases or becomes so much weakened from any cause, such as hereinafter mentioned, as to be insufficient to hold up the armature A it will drop, and its weight will carry down the outer end of the lever A', which is located beneath the armature. This will raise the opposite end of the lever A', and with it the bar c, which will allow the springs s to move outward away from the lug l, and then the weight of the several parts of the circuit-breaker, aided by the springs L, will pull the ends of the bar D out of contact with the spring-jaws M, and thus break connection with the feed-line. As will be readily understood, this will occur by reason of a break in any of the wires included within the section connected with each circuit-breaker, because it will cut off the current through the electro-magnet E, and its armature A will fall and cause the circuit-breaker to operate. It will also operate whenever an overhanging wire falls upon either of the wires of the supplemental circuit of any section and extends downward, so as to make a short circuit to the ground, for the reason that the current through the electro-magnet E will be so much reduced as to make it insufficient to hold up the armature A; also, in order to make the circuit-breaker effective when the high-potential or dangerous current is caused to pass over the supplemental circuit by reason of an overhanging wire coming in contact with either of the guard-wires of the supplemental circuit and a trolley-wire, a fusible connection r is placed in the line b', leading to the electro-magnet, so that whenever a current passes over that line sufficiently great to burn out that connection the current through the electro-magnet will cease, its armature will fall, and the circuit-breaker be operated, as heretofore explained.

In order that intelligence may be conveyed to the central station when any particular section of the system has been cut out of the circuit by the operation of the circuit-breaker connected therewith from either of the causes above named, we place in the same box with the circuit-breaker a signaling apparatus U and hold its clock mechanism at rest by means of a pawl u, pivoted at 6, and extend the opposite end of the pawl-lever into the path of movement of the bar D or some other moving portion of the circuit-breaker, so that when it falls it will raise the pawl from the ratchet of the signaling apparatus and allow it to record the number of the box upon the usual automatic printing-telegraph machine, which may be placed in the central office, (indicated at V.) This signaling-circuit may be continuous throughout the entire electrical system and is indicated by the lines marked v. For convenience, a telegraph-key 14 or a telephone 15 may be placed in this signaling-circuit at each box where the circuit-breaker is located, and also at the central station.

In order that the armature A of the electro-magnets in the several boxes with the circuit-breakers may not fall, and thus cause the circuit-breaker to operate when the feed-current is intentionally turned off at any time, and thus necessitate a visit to each box for the purpose of adjusting the circuit-breakers before the main current can be turned on to the several sections of the system again, we run an independent line w from the central station to and through each electro-magnet in each box containing a circuit-breaker, which magnet is placed in a position to control the armature A, and may be either an independent magnet placed over the armature A, beside the magnet E, or the magnet E may be a double-wound magnet, through one wire of the coils of which the current for this independent line w will pass. This current may be supplied from a battery X at the central station or from a small dynamo used for the purpose. This independent current may be connected or broken by means of a switch 7, or it may be automatically closed by passing the main current through a solenoid Z so constructed that its core 8 will drop upon the contact 9, when the main current upon the conductor between the solenoid and the electrical generator has fallen below, say, ten volts. This will close another battery-circuit Q, which will energize a magnet q in its circuit, draw back the hooked armature 10, release the lever 11, the opposite end of which will be pulled downward by a spring 12, and thus automatically close the independent circuit w through the metal contact 13.

Instead of the arrangement shown in Fig. 1 for automatically switching the current from battery X upon the line w, we may use the modification shown in Fig. 7, in which the core 8 of the solenoid Z is attached by a pivoted connection directly to a lever 11, with an intervening insulating-piece p, the lever 11 being pivoted at one end to the metal piece t, with which a branch running to line w is connected. Along the lever 11 at suitable intervals metal contact-fingers 10 10' project downward, and directly below these fingers mercury-cups m m' are placed, m being connected with battery X and m' with battery Q. The finger 10' is insulated from the finger 10, and by a flexible conductor is connected with the pole of battery Q opposite to that with which the cup m is connected. Thus when the core 8 is released by the decrease of the current through the magnet Z the lever 11 will drop, the fingers 10 10' will enter the mercury in the cups beneath, the battery-current X will be sent over the line w through the cup m, finger 10, lever 11, metal contact t, and the wire extending therefrom to the line w, and the circuit from the battery Q will be completed through the cup $m'$, finger $10'$, and the flexible conductor connected therewith and cause the bell in that circuit to ring. Upon the end of the lever 11 opposite its pivot a sliding weight may be placed to regulate the amount of power required in the magnet Z to hold up the lever. To prevent the fingers 10 $10'$ striking the bottom of the cups $m$ $m'$, we may provide a stop $n$, of insulating material, upon which the end of the lever 11 will rest when it has dropped far enough to make perfect contact with the cups.

In order to insure greater certainty in the operation of the devices just described for automatically switching the battery-current onto line $w$ when the main current is cut off from the feed-wire between the source of power and the first shunt connection B, the magnets E in each cut-out box may be constructed, for instance, in the manner described in United States Patents Nos. 144,285, granted to G. M. Phelps November 4, 1873, or 260,652, granted to C. F. Brush July 4, 1882, to retard the demagnetization and thus give sufficient time for the battery-current X to be switched upon the line $w$ before the magnets E will release their armatures. This independent circuit $w$, passing through the electro-magnet in the box with the circuit-breaker, as above described, is used to hold up the armature A only when the main current is turned off, and will operate automatically only when the main current is broken at the power-station or between the source of power and the first branch connection B. If the feed-wire is broken, of course the current will be cut off from the entire system beyond such break and all the cut-outs in that portion will operate, and information of the fact will be communicated to the central station through the signaling apparatus. If, however, the break is beyond the first shunt connection B and the end of the feed-wire on the side of the break toward the source of power does not make a ground connection, the portion of the system between those two points will continue to be operative; but if the end of the feed-wire makes a ground the fusible plug at the electrical generator will doubtless be burned out and the current cut off from the whole system.

If at any time it is desired to cut the circuit-breaker out of the main line, either for the purpose of repair or for other reasons, we provide a switch 16, for example, consisting of a ring of metal arranged to slide upon an insulating-bearing 17 and having a double set of toggle-arms pivoted thereto and a metal contact 18, against which said piece of metal 16 may be pressed, and thus close the circuit from the conductor B through this shunt-circuit to the conductor $B'$ independently of the position which the circuit-breaker may occupy.

In order to protect the electro-magnets and other apparatus within the box of the circuit-breaker from the effects of lightning, which may strike upon one of the guard-wires, we place lightning-arresters at 19 and 20 in the circuit of the supplemental system of wires and connect each of said lightning-arresters with ground at $g'$ $g^2$.

In Fig. 3 is illustrated the manner in which the span-wires, which sustain the trolley-wires and the guard-wires, may be connected in the supplemental system. In order, also, to operate the circuit-breaker in the event of a break in either of said span-wires, or of their contact with an overhanging wire which has a ground connection, these span-wires are put in circuit with the guard-wires by means of an insulating connection 21 at a point, for instance, where the guard-wire G crosses its sustaining span-wire $S'$, and then by means of the connecting-wires 22 23 24 25 the two span-wires S $S'$ are made a part of the said supplemental system in each section of the main line, and a current passing upon the wire G, when it arrives at the insulating connection 21, will pass over the connecting-wire 22, down wire 23, across the span-wire S, up the wire 24, back across the span-wire $S'$, over the connecting-wire 25, and thence along the wire G upon the opposite side of the insulating connection 21.

In Fig. 2 the branch wire B is shown connected to both metal contacts M. This may be done by "splitting" the conductor B back of the frame H; but usually it will be sufficient to connect the conductor B to one only of the contacts M.

In Figs. 4 and 5 the box in which the cut-out and its accompanying apparatus are contained is designated by D and the resistance by R, and, for convenience, in Fig. 5 the resistance is shown at the end of the section opposite to that at which the cut-out is located.

In Fig. 6 two switches 16 are illustrated, one upon either side, by which the circuit-breaker can be cut out of the line for the purpose of repair or otherwise. The circuit through the switches is closed by sliding the metal ring 16 upon the insulating-piece 17 until it bears upon the metal contact 18, and in the same figure B+ and $B'+$ indicate the wires carrying the positive current, and B— and $B'$— the wires carrying the negative current, and $b'$ the branch from the positive current of the supplemental or guard-wire system, $b^2$ being the branch from the negative current of the same system.

The cut-out shown in Fig. 6, which is intended for use with a metallic circuit, has the two ends of the bar D insulated from one another, as indicated by the heavy shaded portion, and in Fig. 5, which illustrates the connections as applied to a metallic circuit, $b$ is the branch from the trolley-wire carrying the high-tension positive current, $b'$ the branch from the positive wire of the supplemental or low-tension current, and $b^2$ and $b^3$ are branches from the negative wire of the supplemental circuit, and the circuit over this metallic system is as follows: The positive current from the dynamo passes over the feed-wire F and at each shunt connection over B+ through one end of the cut-out bar D, Fig. 6, and out over the wire B'+ to the trolley-wire T+. When there is a car in the section, a portion of the current passes from the trolley-wire T+ down through the motor of the car, up to the trolley-wire T—, thence by the wire B'— through the other end of the cut-out bar D, and by the wire B— back to the dynamo. While all the wires of the system remain intact there is a small current constantly passing from the trolley-wire T+, over the branch $b+$, through the resistance R, back to the guard-wire G+, down the wire $b'$, through the magnet E, Fig. 6, back over the wire $b^2$ to the guard-wire G'—, thence over the wire $b^3$, through another resistance in box R, out to the trolley-wire T—, thence, as before, by wires B'— and B— to the dynamo.

We claim—

1. In combination with an electric main line which has a mechanical circuit-breaker in circuit, a parallel supplemental circuit adjacent thereto, an electrical resistance between the main and supplemental lines, and an electro-magnet in the supplemental circuit to effect the operation of the said circuit-breaker, substantially as described.

2. In combination with the main-line conductors for carrying an electric current, a supplemental system of electrical conductors adjacent and parallel thereto, an electrical resistance between the main and supplemental lines, a mechanical circuit-breaker in the main line, and an electro-magnet in the supplemental system placed in proximity to the said circuit-breaker, whereby the release of the armature of the magnet will cause the circuit-breaker to operate, substantially as described, and for the purpose specified.

3. In combination with an electric main line having in its circuit a mechanical circuit-breaker, an electro-magnet in a parallel circuit which controls the said circuit-breaker, an electrical resistance between the main and supplemental lines, and an automatic signaling apparatus to indicate at the central station each operation of the circuit-breaker, substantially as described.

4. In combination with an electric main line which has in circuit a mechanical circuit-breaker, an adjacent and parallel supplemental line in circuit with the main line, a resistance-box between the main and supplemental lines, an electro-magnet in the supplemental circuit, which controls the operation of the circuit-breaker, and an independent circuit to control the armature of the electro-magnet when the main-line current is cut off at the source of power, substantially as described.

5. In combination with an electric main line provided with an automatic circuit-breaking switch, an adjacent and parallel supplemental line in electrical connection therewith, a resistance-box between the main and supplemental lines, and an electro-magnet in the supplemental line to control the operation of the automatic circuit-breaking switch, substantially as described.

6. In combination with the conductor of a high-potential or dangerous electrical current which has a mechanical circuit-breaker in circuit, a supplemental parallel system of conductors of a low-potential or harmless electric current, an electric resistance between the two lines of conductors, and an electro-magnet in the supplemental system, which controls the said circuit-breaker, whereby the breaking of the supplemental line or the diversion of its electric current will operate the circuit-breaker and cut out the dangerous current, substantially as described.

7. In combination with the conductors of a high-potential or dangerous electric current which have a mechanical cut-out in circuit, an adjacent and parallel supplemental system of conductors of a low-potential or harmless current, with an electro-magnet in circuit which controls the operation of said cut-out and is energized by said low current, an electrical resistance connecting the conductors of the high and low potential currents, and a fusible connection between the supplemental system and the electro-magnet, whereby the accidental contact between the said high and low potential conductors will melt the fusible connection and operate the said mechanical cut-out, substantially as described.

8. In the overhead trolley system of an electric railway, the combination of the trolley-wires provided with a mechanical safety cut-out in circuit, the guard and span wires in electrical connection therewith through a resistance-coil, and an electro-magnet in the guard-wire circuit to control the operation of the safety cut-out, substantially as described.

ROBERT A. MORGAN, JR.
GEO. C. BOSSON, JR.

Witnesses:
J. L. BELFLER,
T. J. CUNNINGHAM.